United States Patent [19]

Matsumoto et al.

[11] Patent Number: 4,827,109

[45] Date of Patent: May 2, 1989

[54] PHOTOGRAPHIC PRINTING SYSTEM

[75] Inventors: Fumio Matsumoto, Tokyo; Takaaki Terashita; Kiichiro Sakamoto, both of Kanagawa, all of Japan

[73] Assignee: Fuji Photo Film Co., Ltd., Kanagawa, Japan

[21] Appl. No.: 157,028

[22] Filed: Feb. 18, 1988

[30] Foreign Application Priority Data

| Feb. 18, 1987 | [JP] | Japan | 62-34908 |
| Feb. 18, 1987 | [JP] | Japan | 62-34909 |
| Mar. 6, 1987 | [JP] | Japan | 62-51409 |
| Apr. 18, 1987 | [JP] | Japan | 62-95849 |
| Sep. 4, 1987 | [JP] | Japan | 62-221263 |

[51] Int. Cl.$^4$ ............................................. G06F 15/20
[52] U.S. Cl. .................................... 235/375; 235/376; 235/492
[58] Field of Search .................. 235/375, 376, 492

[56] References Cited

U.S. PATENT DOCUMENTS 4,654,512 11/1921 Gardosi ............................. 235/376

Primary Examiner—Harold I. Pitts
Attorney, Agent, or Firm—Sughrue, Mion, Zinn, Macpeak & Seas

[57] ABSTRACT

A photographic printing system comprising a printer-processor; a plurality of non-contact IC cards in which various printing conditions, printer-processor operating conditions, and the like are stored; and an IC card read-write unit for reading and writing data on the above-mentioned conditions. The plurality of IC cards are used selectively according to printing purposes and are inserted into the read-write unit. When the selected IC card is inserted into the read-write unit, the read-write unit accesses the data stored in the IC card to set the printer-processor automatically to the printing and operating conditions suitable for the printing purpose. After printing, the read-write unit writes the printing conditions and conditions under which the printer-processor has acutally been operated in the IC card.

23 Claims, 14 Drawing Sheets

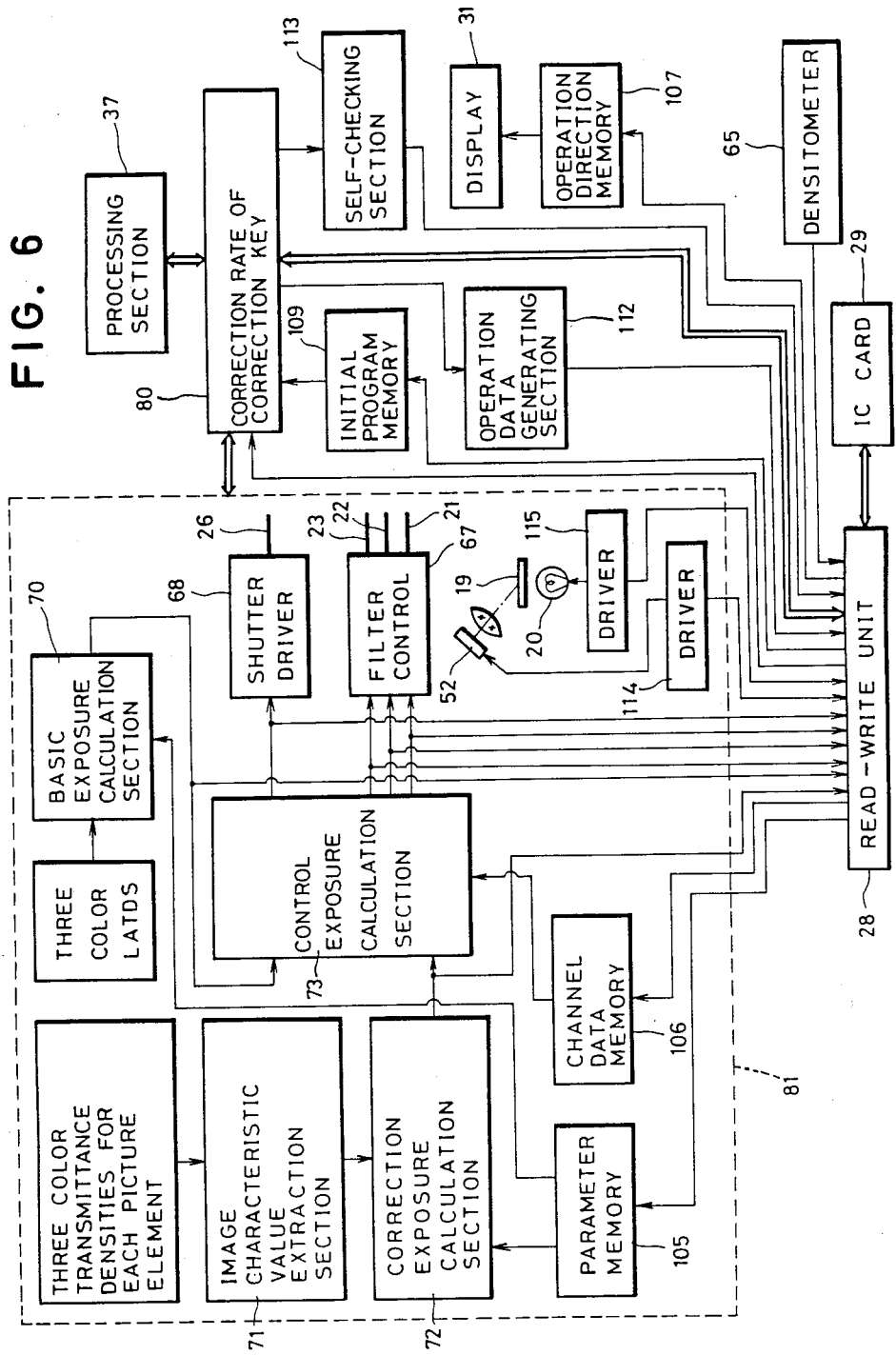

NEGATIVE NUMBER : 12
    FILTER ORIGINAL POSITION
    LIGHT INTENSITY

FRAME NUMBER : 1
    BASIC EXPOSURE
    CORRECTION EXPOSURE

FRAME NUMBER : 2
    BASIC EXPOSURE
    CORRECTION EXPOSURE

NEGATIVE NUMBER : 12
    FILTER ORIGINAL POSITION
    LIGHT INTENSITY
    CHANNEL DATA

FRAME NUMBER : 1
    FILTER ADJUSTED POSITION
    EXPOSURE TIME

FRAME NUMBER : 2
    FILTER ADJUSTED POSITION
    EXPOSURE TIME

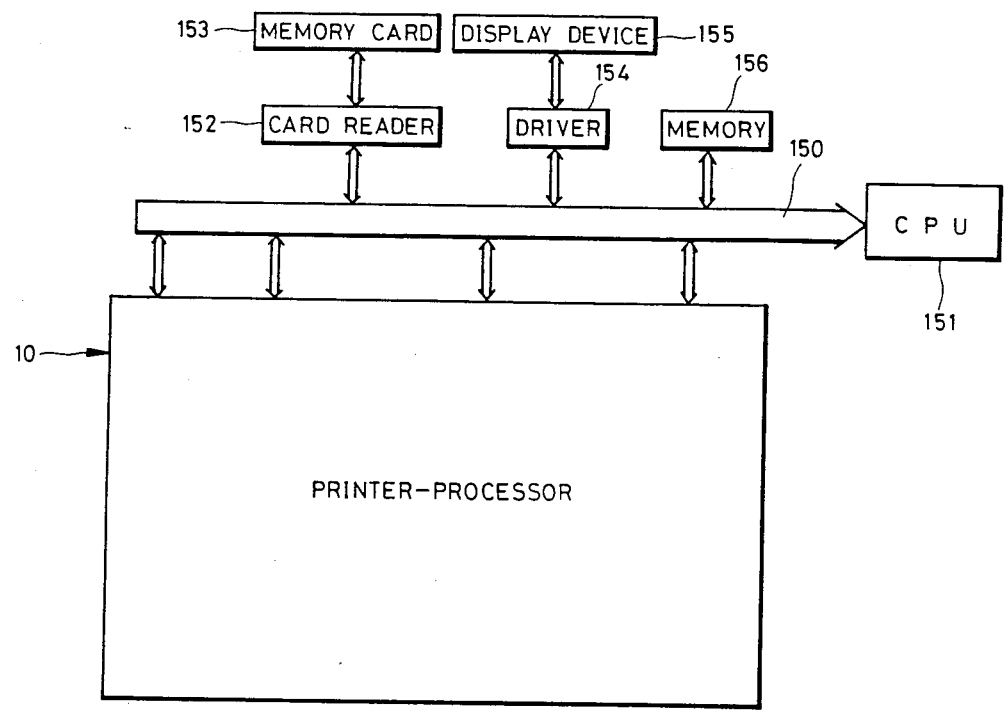

PHOTOGRAPHIC PRINTING SYSTEM

BACKGROUND OF THE INVENTION

The present invention relates to a photographic printing system in which non-contact type integrated circuit (IC) cards are used to control operations of a printer-processor.

It is well known in the art to use IC cards in order to back up channel data on manufacturers, sensitivities of photographic materials, emulsions or the like stored in photographic printer-processors. In photographic printing system using such IC cards. even though the channel data stored in the printer-processor is erased due to errors which might arise during operation. it is easy to restore the channel data by reading it out from the IC card and rewriting it in a memory of the printer-processor.

The IC cards are used to back up the channel data. Because this data is fixed or standard, the card does not contribute to improving the function or efficiency of printer-processors.

A functional problem associated with the IC cards is that, because an IC card consists of an IC circuit sandwiched between plastic plate and a plurality of parallel contacts formed on the plastic plate. the card is susceptible to static electricity and has limited durability because of wear on the contacts. Before and after the insertion of the IC card in the printer-processor, it invariably is necessary to perform the troublesome operation of shutting off the power supply to the printer-processor in order to protect the data stored in the IC card.

Conventionally. when printing errors occur often, because there are so many possible causes but no detailed record of operation for the printer-processor, it is difficult to ascertain accurately the causes of a printing error when one occurs. As a result, it is very hard to take proper corrective action.

Meanwhile. the printer-processor needs to have appropriate printing conditions defined at the start of its operation. The appropriate printing conditions are entered by using a keyboard. Such printing conditions include channel data as described above, correction ratios for each step of a color correction key and a density correction key, and operation modes of a scanner. Usually, the printer-processor has three operation modes, namely a scanner full-auto mode suitable for beginners, a scanner pre-judge mode suitable for more skilled operators, and a scanner key-adding mode suitable for expert operators.

In the scanner key-adding mode, the operator can manually effect an exposure correction by using correction keys. The scanner pre-judge mode allows the operator to enter image information on, for example, an image contrast of a negative. The printer-processor in the scanner pre-judge mode can determine automatically a proper exposure based on the image information. In the scanner full-auto mode, the printer-processor automatically determines a proper exposure based on an output from the scanner.

These printing conditions and operation modes are selectively set in the printer-processor every time the printer-processor is started. Because the setting of proper printing conditions and a printing mode is troublesome setting errors often are caused.

Additionally, when making extra prints from a negative, it is difficult to set the same printing conditions as those set for the previous printing of the negative.

SUMMARY OF THE INVENTION

In view of the foregoing and other deficiencies, it is an object of the present invention to provide a printing system in which the operating conditions of a printer-processor can be well controlled by using a non-contact type IC card.

It is another object of the present invention to provide a printing system in which printing conditions can be automatically set in a printer-processor by using a non-contact type IC card. It is a further object of the present invention to provide a printing system in which extra prints can be made under the same printing conditions at any time.

The above and other objects of the present invention are achieved by providing a printer-processor with a reading and writing means which reads out data on operating conditions in a non-contact type card to initialize the printer-processor and which writes in the IC card various operational conditions for the printer-processor.

Factors which are necessary for effective control of the operation of the printer-processor are exposure controlling conditions, records of operating conditions, records of adjustments and errors or troubles. controlled records of the processor, and the like. For recording these control factors, an IC card is used and inserted in a read-write unit incorporated in the printer-processor. Because the IC card can read and write data in a non-contact manner. it is free from effects of static electricity. improper contact or the like.

Exposure control conditions include adjustment amounts or positions of color filters for each print, exposure time for each print or a mean exposure time for a negative, basic exposure, and correction exposure which are factors essential for understanding the cause of an error or trouble in the printer-processor. Operation data includes identification numbers (one for each negative), photographic paper types, total number of prints, and the like. These data are used to prepare an up-to-date daily operation report or the like. Printer-processor operating conditions include change in lamp voltage or light intensity, change in scanner charging time, change in scanner off-set value, and the density and gray balance of prints made from a control negative. Other control items include errors, the record of warnings, the temperature and replenished amount of developer, and the record of replacement of developer.

In accordance with one feature of the present invention, there are provided a plurality of noncontact type IC cards in which different printing conditions are stored. The IC cards are selectively inserted into the read-write means so as automatically to set the printer-processor for different printing conditions. One IC card may be provided for every operator, for every printing service, or for every printing purpose. When the IC cards are provided for various operators, each individual IC card has data regarding printing conditions such as a color correction rate of correction key, a scanner mode to be selected, or the like, established according to the operators taste in printing and skill. On the other hand, the IC card may be a normal printing card, a studio photograph printing card, a travel picture printing card, or the like. These IC cards are used selectively to set the printer-processor automatically for intended printing conditions according to the purpose of printing service.

BRIEF DESCRIPTION OF THE DRAWINGS

The foregoing and other objects of the present invention will become apparent from the following description of preferred embodiments thereof with reference to the accompanying drawings in which the same reference numerals designate the same or similar parts throughout several views, and wherein:

FIG. 6 is a functional block diagram of an essential part of another preferred embodiment of the present invention;

FIG. 13 is a block diagram schematically illustrating the printer-processor system of a yet further preferred embodiment of the present invention;

DETAILED DESCRIPTION OF THE PREFERRED EMBODIMENTS

Figure 1:
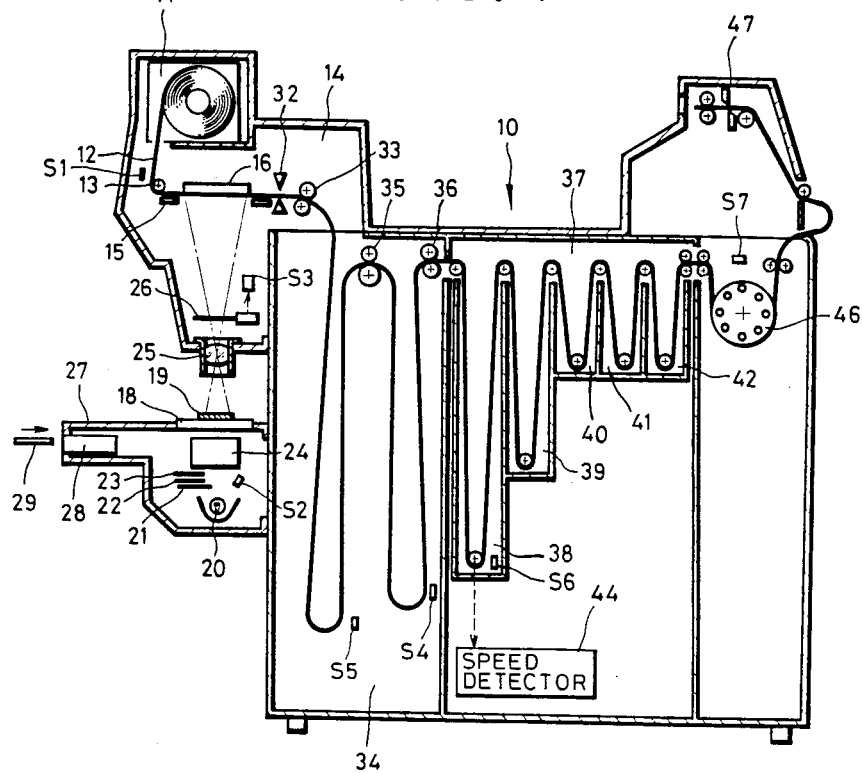
FIG. 1 is a fragmentary cross-sectional view showing a printer-processor embodying the present invention.

FIG. 1 shows a color printer-processor in which the present invention is embodied. The printer-processor 10 has removably mounted on its top a paper magazine 11 in which a roll of color photographic paper 12 is contained. The color photographic paper 12 is withdrawn. one frame at a time, by a roller 13, and is placed in position between an exposure mask 15 and a pressure plate 16 which are disposed in an exposure chamber 14.

Under the exposure chamber 14, there is a table 27 on which a negative carrier 18 holds a color negative 19. A lamp 20 is provided under the negative carrier 18 to illuminate the color negative 19 held in the negative carrier 18 through respective cyan, magenta. and yellow filters 21. 22 and 23. As is well known in the art, by passing the light from the lamp 20 through the color filters 21. 22 and 23, three color components of light can be adjusted as desired for proper printing. The printing light is uniformly mixed in a mirror box 24 and illuminates the color negative 19 from its back side. The color photographic paper 12 is exposed to the illuminated color negative 19 through a printing lens 25 and a shutter 26.

In the table 27, there is a read-write unit 28 which has placed therein a non-contact IC card 29 (which will be described in detail later) before the printer-processor 10 is started or has its printing conditions reset. The IC card 29 comprises an IC chip. or an LSI chip, and a sheet coil plate sealed in or sandwiched between plastic cards. Data communication is effected between the IC card 29 and the read-write unit 28 in a serial non-contact manner. The IC card 29 is advantageous in that it is free from static electricity. connection errors, and wear and tear: also. the IC card 29 can be inserted in and removed from the read-write unit 28 without shutting off power supply to the read-write unit 28.

To the right of the exposure mask 15 (as viewed in FIG. 1). there is a cutter 32 for cutting off the exposed part of the color photographic paper 12 to a predetermined length at a desired time. A pair of rollers 33 transport the exposed color photographic paper to a reserving chamber 34 in which the exposed color photographic paper 12 is kept in the form of a loop for a period of time. In this reserving chamber 34 there are two pairs of rollers 35 and 36 which suspend the exposed color photographic paper 12 in a double loop.

Adjacent to the reserving chamber 34 there is a processing chamber 37 in which the exposed color photographic paper 12 is processed. In the processing chamber 37 there are various processing tanks, including a color developing tank 38, a bleaching-fixing tank 39, and three consecutive wash tanks 40 to 42. The exposed color photographic paper 12 is passed through these processing tanks 38 to 42 in order to be subjected to color developing, beaching-fixing and washing. Throughout the printer-processor 10 there are sensors Sl to S6 for detecting the photographic paper 2, a predetermined light intensity of the lamp 20, the operation of the shutter 26, the first and second loop of the exposed photographic paper, and the temperatures of developer, respectively. In association with a roller in the color developing tank 38, a speed detector 44 is provided outside the color developing tank 38.

After the processing chamber 37, a dryer drum 46 is provided for drying the processed color photographic paper 12. On the processing chamber 37 a cutter unit 47 is mounted on top of the printer-processor 10. The cutter unit 47 cuts the processed and dried color photographic paper 12 and separates it into individual frames to provide color prints.

Figure 3:
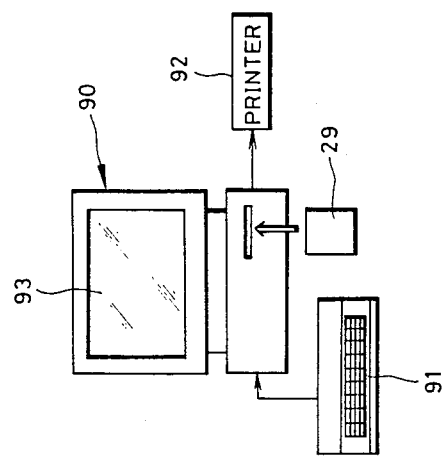
FIG. 3 is an illustration showing an example of a memory map of an IC card for use with the printer-processor of FIG. 1.

As shown in FIG. 3, the IC card has various data areas 29a to 29e for channel data, scanner mode data. function data, data on correction rates of various correction keys, and operation data, respectively. In the channel data area 29a, there is data on manufacturers of photographic materials available for the printer-processor, sensitivities of photographic materials, types of emulsion for the photographic materials, particulars of printing lenses available in the printer-processor, and the like. In the scanner mode area 29b there is data on one of the three scanner modes, namely, the scanner key-adding mode the scanner pre-judge mode, and the scanner full-auto mode. In the function data area 29c there is data on modified printing conditions for making prints with stressed color densities and color balances or for making studio photographs. In the key data area 29d there is data on correction rate for one step of each correction key. In the operation data area 29e there is data on the record of troubles in the printer-processor and the record of operated correction keys.

Figure 2:
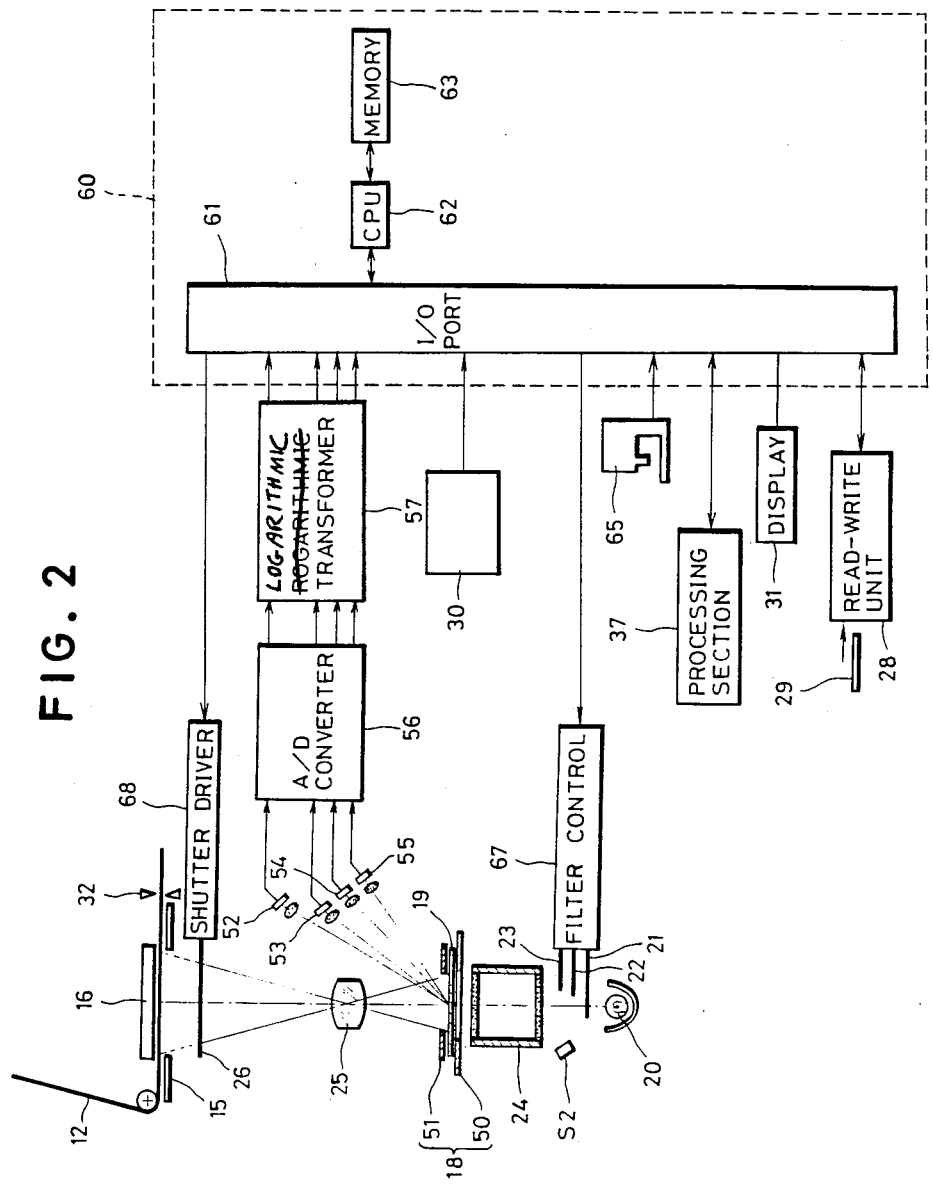
FIG. 2 is a block diagram showing a control section of the printer-processor of FIG. 1.

FIG. 2 shows a control system of the printer-processor 10, in which a negative carrier 18 consists of a plate 50 and a mask 51 between which the color negative 19 is held flat. For detecting three color densities in the color negative 19, there is a scanner 52 for scanning an image just before printing so as to provide time sequential color signals for a number of picture elements into which the color negative is nominally divided. In addition to the scanner 52, there are respective red, green, and blue color sensors 53, 54, and 55 for detecting light passed through the entire area of negative image frame.

The signals from the scanner 52 and the respective sensors 53 to 55 are converted into digital signals by an A/D converter 56, and are logarithmically transformed by a logarithmic transformer 57 to provide density signals which in turn are finally sent to a computer 60.

The computer 60, which consists of I/O port 61. CPU 62, and a memory 63, retrieves the density signals, calculates exposures, retrieves data from the IC card 29 and controls a filter control 67 and a shutter driver 68 as well as the processing section 37. Data on the temperature of developer and the speed of the color photographic paper detected by the sensors S6 and 44 respectively, are sent to the computer 60. A densitometer 65 detects the density and gray balance of a print made from a control negative. Data in accordance with the detection is sent to the computer 60. An operating panel or keyboard 30 and a display device 31 also are shown. The display device 31 displays calculated exposures and color filter values when the scanner pre-judge mode is selected, and displays input data when the channel data is manually set.

Figure 4:
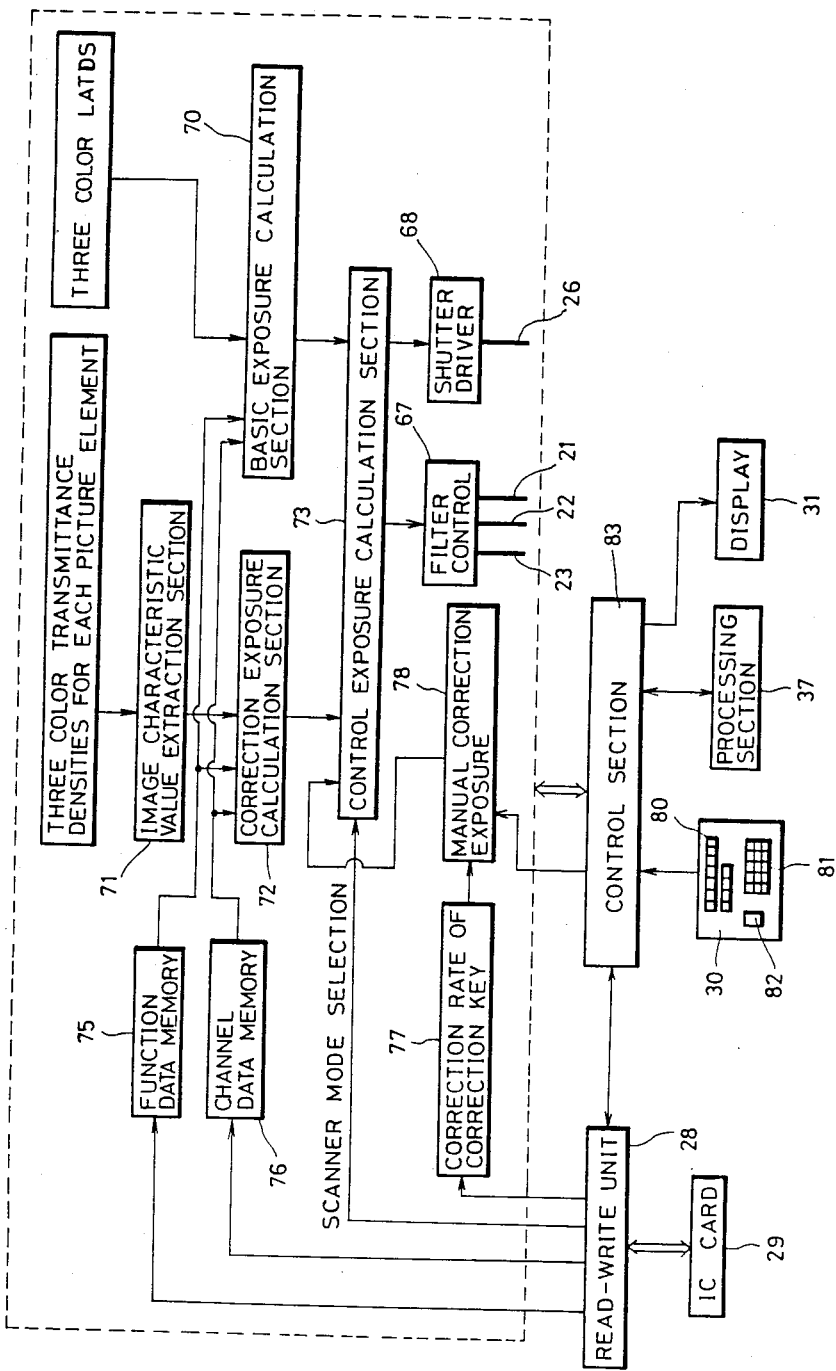
FIG. 4 is a functional block diagram of an essential part of a preferred embodiment of the present invention.

FIG. 4 shows the function of the printer-processor 10 according to the present invention. The sensors 53 to 55 detect large area transmittance densities (LATDs) of the color negative 19 for the respective colors which are written in the memory 63 immediately before printing. The LATDs for the three colors are retrieved from the memory 63 and are sent to a basic exposure calculation section 70. In the calculation section 70, based on the LATDs, a basic exposure is calculated for each color by using a basic exposure calculation formula. The three color density signals detected by the scanner 52 also are transmitted to an image characteristic value extraction section 71 which extracts an image characteristic value, such as a maximum density, a minimum density, or a density of a picture element at a particular position. The extracted characteristic value is sent to a correction exposure calculation section 72 which calculates a correction exposure for each color by the use of a correction exposure calculation formula.

The basic exposure and the correction exposure are added together according to color in a control exposure calculation section 73. The filter control 67 and the shutter driver 68 are controlled and operated in accordance with the output of the control exposure calculation section 73 so as to effect a proper exposure.

As has been described previously, printing condition data is read out by the read-write unit 28. For example the function data read out by the read-write unit 28 may be stored in a function data memory 75 as a part of the memory 63, and the channel data is written in the channel data memory 76. These data are then sent to the exposure calculation sections 70 and 72 to calculate the basic and correction exposures, respectively. On the other hand, the correction rate for each step of the correction key first is stored in a memory 77 and then is sent to a manual correction exposure calculation section 78 to obtain the correction exposure manually. The data for selecting the scanner modes is sent to the calculation section 73.

The keyboard 30 has various keys such as correction keys 80 for entering instructions to correct color density and color balance, printing condition setting keys 81 for setting or changing printing conditions manually, and a print key 82 for starting printing. When manually entering data for correcting color densities and colors, the correction keys 80 are operated selectively to transmit correction signals to the manual correction exposure calculation section 78 through a control section 83 to calculate correction exposures in accordance with the correction rate provided when a correction key is operated. The correction exposure then is sent to the control exposure calculation section 73.

When the IC card 29 is provided as a private card, individual to the operator, the channel data is stored in the channel data memory 76 and a specific scanner mode suitable for the operator is set automatically in the control exposure calculation section 73. There are various modes, for example, a scanner full-auto mode suitable for beginners, a scanner pre-judge mode suitable for improved operators, and a scanner key-adding mode for skilled operators.

If the IC card 29 has a specified purpose, proper printing conditions are set accordingly. For example, when the IC card 29 is used to effect a standardized printing, standard printing conditions are set. If the IC card 29 is prepared for printing studio photographs, function data is stored in the memory 75 to change parameters of the exposure calculation equations.

When using the IC card 29 provided for skilled operators, for example, after automatically setting printing conditions as described above, the color negative 19 is placed in the printing position, and is visually examined as to whether an automatic exposure control based on LATDs would be preferred to provide well finished prints. If the color negative 19 is expected to produce color failure, a correction key 80 of the keyboard 30 is operated to enter an instruction for color correction or density correction. This instruction is sent to the control exposure calculation section 73 through the control section 83 to calculate a correction value according to the correction rate corresponding to the operated key. The resultant correction value is sent to the calculation section 73.

After the visual examination of the color negative 19, the print key 82 is operated to provide printing light. At this time, because the color filters 21 to 23 are placed in their original positions, the printing light is regulated to have a normal proportion of three color components. Consequently, a color image on the color negative 19 is measured by the scanner 52 and the sensors 53 to 55 to provide three color signals of the color negative 19, which in turn are stored in the memory 63 after being digitally and logarithmically transformed.

Based on the three color signals of the picture elements, an LATD is calculated for each color and sent to the basic exposure calculation section 70, in which a basic exposure is calculated by color by substituting the LATD and the channel data retrieved from the channel data memory 76 into the basic exposure calculation equation. The basic exposure and the manually provided correction value are added together in the calculation section 73 to provide a control value by which the color filters 21 to 23 and the shutter 26 are controlled so as to make a proper exposure.

The filter control 67 adjusts positions of the color filters 21 to 23 according to the control exposures provided by the control exposure calculation section 73. After these position adjustments, the lamp 20 emits light at full capacity, and simultaneously the shutter 26 is opened exposing the color photographic paper 12 to the printing light. The exposed color photographic paper 12 is transferred into the reserving chamber 34 and the unexposed part of the color photographic paper 12 is placed in the exposure position for the next exposure.

Before effecting the next exposure the color negative 19 is moved to place another frame in the negative carrier 18. That next frame is examined visually as to whether a color balance correction or a density correction is needed in the same manner as described previously. Thereafter, the printing key 82 is operated to start the next exposure. As the exposures progress, the exposed color photographic paper 12 is forwarded into the reserving chamber 34 and reserved therein in the form of a double loop for a period of time. In this way, when a predetermined number of exposures have been completed, the exposed color paper 12 is cut by the cutter 32 at the end of the last exposed part. The exposed color photographic paper 12 then is subjected to color processing by being passed through the color developing tank 38, the bleaching-fixing tank 39 and the three washing tanks 40 to 42 in order. Thereafter, the processed color photographic paper is dried by the drying drum 46 and then is cut by the cutter unit 47 to provide individual prints.

Data on the correction keys which are operated as a result of visual examinations of the color negative 19 are filed in the operation data area 29e of the IC card 2 through the control section 83 and the read-write unit 28. If there are errors or difficulties in the printer-processor 10, even during a printing operation, data on these errors and difficulties also are written in the IC card 29. These operation data can be read out through a personal computer 90 (see FIG. 5) after the completion of printing operation. The data on the operated correction keys is used to check the tendency of correction of the operator; the data on errors or difficulties is used to analyze the cause of error or difficulty which occurred in the printer-processor. The IC card 29 can be used as an operation control register for recording the number of prints, operating conditions of specified sections of the printer-processor 10, or items of operation of the printer-processor 10 such as the temperature of developer in the developing tank 38, the process speed of the photographic paper, or the like.

In the mini-lab shops, while an operator normally responsible for full service of the printer-processor is absent, urgent prints occasionally are ordered and a non-professional is forced to operate the printer-processor. In such a case, it is sufficient for the non-professional to insert a beginner s IC card into the read-write unit 28 of the printer-processor 10. When the beginners IC card is inserted into the read-write unit 28, the printer-processor 10 automatically changes its printing condition from the scanner key-adding mode to the scanner full-auto mode. Therefore, the non-professional can operate the printer-processor 10 by operating only the printing key 82 following the insertion of the beginner s IC card into the read-write unit 28. In this case, the three color LATDs of each picture element are sent to the image characteristic value extraction section 71 to detect a characteristic value such as a maximum density, a minimum density, or the like. Based on the characteristic values of the respective picture elements, correction exposures for the three colors are calculated in the correction exposure calculation section 72. In the control exposure calculation section 73, an exposure time and the position adjustments of the color filters are calculated in accordance with the sum of the calculated correction exposures and basic exposures. After adjusting the positions of the color filters 21 to 23 to the calculated positions, the color photographic paper 12 is exposed in a subtractive color printing.

Although IC cards generally need to be inserted into and removed from a read-write unit, power to the read-write unit is shut off, non-contact IC card 29 may be inserted into and removed from the read-write unit when the power is on.

Figure 5:
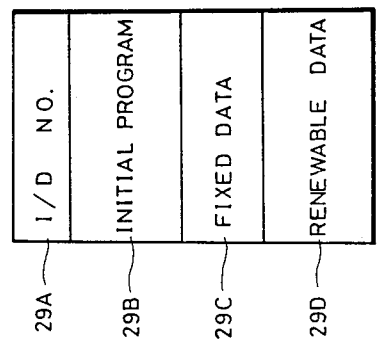
FIG. 5 is an illustration showing another example of the memory map of the IC card.

FIGS. 5 and 6 show another embodiment of the present invention wherein the operating conditions of printer-processor is controlled by using the IC card 29. As shown in FIG. 5, the non-contact IC card 29 has several memory areas such as an ID number area 29A, an initial program are, 29B, a fixed data area 29C, and a renewable data area 29D. The ID number area 29A stores an ID code number which makes the printer-processor operative. In the initial program area 29B. there is stored an initial program for sequential control of operation of the printer-processor 10. With the initial program area 29B in the IC card 29, it becomes quite easy to upgrade or downgrade the initial operation of the printer-processor 10. In the fixed data area 29C. there are channel data on manufacturers of photographic materials available in the printer-processor, sensitivities of the photographic materials, emulsion types of the photographic materials, parameters of exposure calculating formulas, an operating directory and the like. In the renewable data area 29D there are written data on operating conditions such as exposure controls for respective frames, particulars of the light source, filter adjustment positions for respective frames, charging times and off-set values of the scanner, the temperature of color developer, processing speeds, and data on repaired parts, the date of repair, density and gray balance data of prints made from a control negative, data on problems and the date thereof, and the like.

In the embodiment shown in FIG. 6, the printer-processor 10 itself is the same in construction and function as that of the previous embodiment shown in FIGS. 1 and 2. The sensors 53 to 55 detect three color LATDs of the color negative 19 immediately before printing. The detected LATDs are written in the memory 63 (see FIGS. 1 and 2). Based on the three color LATDs, the basic exposure calculation section 70 calculates basic exposures for the respective colors by using a basic exposure calculating formula. On the other hand, three color densities of each picture element detected by the scanner 52 are sent to the image characteristic value extraction section 71 to extract an image characteristic value such as a maximum density, a minimum density, or a density of a specified picture element. This image characteristic value then is transmitted to the correction exposure calculation section 72 to calculate a correction exposure for each color by using a correction exposure calculation formula.

The control exposure calculation section 73 adds together the basic and correction exposures for each color. The resultant exposure is further corrected with reference to selected channel data. According to these finally corrected exposures for the three colors, the calculation section 73 determines proper filter positions and a proper exposure time and provides the filter control 67 and the shutter driver 68 with corresponding control signals.

Data on the basic and correction exposures and the filter positions and exposure time are determined immediately before printing for each frame of the color negative 19 and are written in the IC card 29 through the read-write unit 28. This data may be used to investigate causes of defective prints.

As described previously, the various data written in the IC card 29 are read out by the read-write unit 28. Specifically, the parameters for the calculation formula are read out from the IC card 29 and are written in a parameter memory 105 before being sent to the exposure calculation sections 70 and 72. The channel data are written in a channel data memory 106 before being sent to the control exposure calculation section 73. If various channel data are written in the channel data memory 106, any one piece of channel data can be selected by operating an appropriate key on the keyboard 30. Operating direction data are written in a operation direction memory 107 and are read out for display on the display 31 when a problem has occurred and it is necessary to perform a sequential trouble-shooting operation.

The initial program stored in the IC card 29 is read out and stored in an initial program memory 109 for executing a sequential control operation in a control section 80 which controls the exposure control section shown in a dotted block in FIG. 6, and which also controls the processing section 37. The control section 80, also reads data on the operating conditions of the processing section 37, such as data on the temperature of color developer, processing speed, the renewal date of color developer, or the like in the IC card 29 through the read-write unit 28. The control section 80 is actuated by the aid of the ID number stored in the IC card 29 to operate the various functional sections. Once actuated, the control section 80 sends operational data to the operation data generating section 112 for every printing operation. The operational data, which includes data on time of operation. customer numbers, paper types, number of prints, total area of prints, or the like is written in the IC card 29 through the read-write unit 28. The control section 80 can further actuate a self-checking section 113 which can check problems which occurred in the printer-processor 10. The results of self-checking are written in the IC card 29.

The read-write unit 28 writes data on the density and gray balance of print made from the control negative in the IC card 29. Data on the charging time and off-set value of the scanner produced from a driver 114 and on the voltage applied to the lamp 20 produced from a driver 115 are also written in the IC card 29.

In the operation of the printer-processor 10, when the IC card 29 is inserted into the read-write unit 28, the ID number read from the IC card 29 is checked by the control section 80. When the ID number is verified as identical to a registered one, the control section 80 makes the various operating sections operative. As a result, the initial program is read out from the IC card 29 and is written in the initial program memory 109. Simultaneously, the data on the parameters of exposure calculating formulas, the channel data and the operating direction are stored in the memories 105. 106, and 107, respectively.

The sequence of operational control is as follows. The control negative is printed. The print made from the control negative is set in the densitometer 65 to detect the density and gray balance thereof. According to the detected density and gray balance, the voltage applied to the lamp 20 and the positions of the color filters 21 to 23 are regulated. The voltage and the positions are fixed as basic values. Data on the density and gray balance detected by the densitometer 65 and the basic values are written in the IC card 29 through the read-write unit 28 to finish a preparatory printing operation so that the printer-processor 10 is ready for actual printing.

After the color negative 19 is placed in position at the printing station, the printing key 82 of the keyboard 30 is operated to start the sequential control of operation of the printer-processor 10 which is effected in the same manner as described in the previous embodiment.

While the printing operation is being repeated, if a problem has occurred, the self-checking section 113 is automatically actuated to effect a self-check. The self-checking section 113 writes data based on the result of self-check in the IC card 29 through the read-write unit 28. It is convenient to output the data as a code number by which the fixed data area of the IC card 29 is accessed to read out and display trouble data as a statement in a home language on the display device 31. On the other hand, if the sequential control of operation necessary for avoiding the problem is needed a data display key of the keyboard 30 is operated to display the data stored in the operation direction memory 107 as a statement in the home language on the display 31. Furthermore, if there are changes in the temperature of color developer, the speed of processing, the voltage and the intensity of light of the lamp 20, the charging time and the offset value of the scanner 52, the time at which the change occurred and data relating to the change are written in the IC card 29.

After the completion of printing operations, a key of the keyboard 30 is operated to transfer the operated data from the operation data generating section 112 to the IC card 29. Thereafter, the IC card 29 is removed from the read-write unit 28, and the printer-processor 10 is made inoperative. At this time, if power is shut down, the data written in the various memories of the printer-processor 10 are completely erased.

Figure 7:
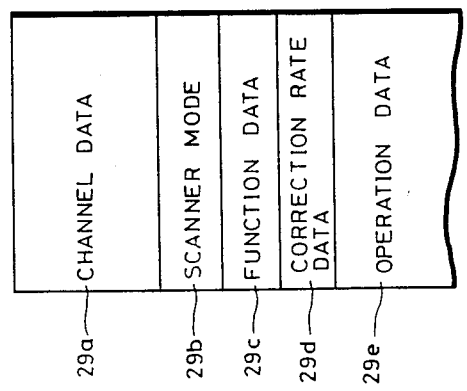
FIG. 7 is a schematic illustration showing a personal computer for reading out information stored on the IC card.

As shown in FIG. 7, when it is necessary to analyze the causes of defective prints, the preparation of a daily or a periodical report of operation, or to enter new data, the IC card 29 is loaded in a personal computer 90. By operating a keyboard 91, various data in the IC card 29 can be displayed on a screen of the personal computer 90 as a visual image and can be printed out by a printer 92. By analyzing either the visually displayed data or the printed data, the causes of the failures can be easily and assuredly ascertained, and necessary measures can be taken to correct the failures. The reports of operation can be automatically prepared by processing the operation data by using any well known statistical processing program.

If connecting such a personal computer, installed in chain-labs, to a host-computer installed in the head office for on-line data processing, the data in the IC card 29 can be read out at the head office to effect centralized control.

Figures 8, 10, 12:
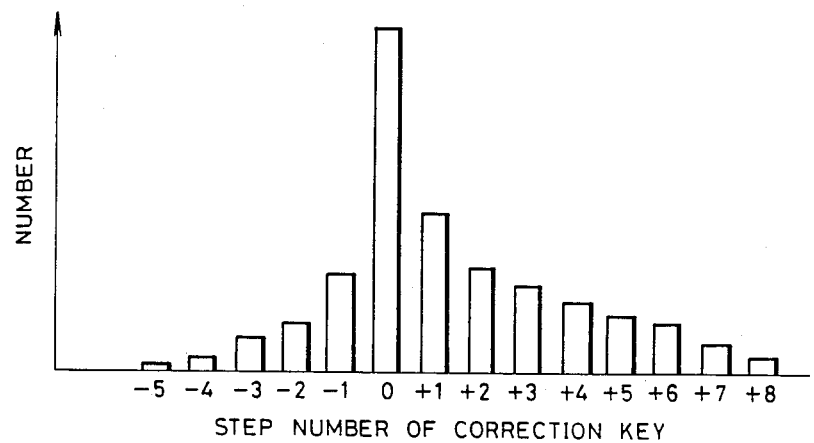
FIG. 8 is a histogram showing correction exposure
FIG. 10 is an illustration showing an example of data recorded in a card used with the embodiment of FIG. 9.
FIG. 12 is an illustration showing an example of data recorded in a card used with the embodiment of FIG. 11.

As is shown in FIG. 8, a histogram for exposure correction can be made by using the personal computer 90 to examine the function of the exposure control section of the printer-processor 10 or of the processing section 37. Generally, if 60 to 70% of all exposure corrections actually effected are estimated to be within a critical key step range, for example, between the steps "−1" and "+1", the exposure control section and the processing section are considered to be functioning properly. If 60 to 70% of all exposure corrections are out of the critical key step range, the exposure control section is considered to be improperly adjusted. If the data on density of a print made from the control negative is fed back to the exposure control section enclosed in a dotted line in FIG. 6, it is considered that there is a problem somewhere in the processing section 37.

In printer-processors without a scanner, exposure corrections are manually effected by operators. Therefore, if exposure corrections actually effected are judged to be improper, it is judged that the operators are insufficiently trained, and have to receive further training.

Figure 9:
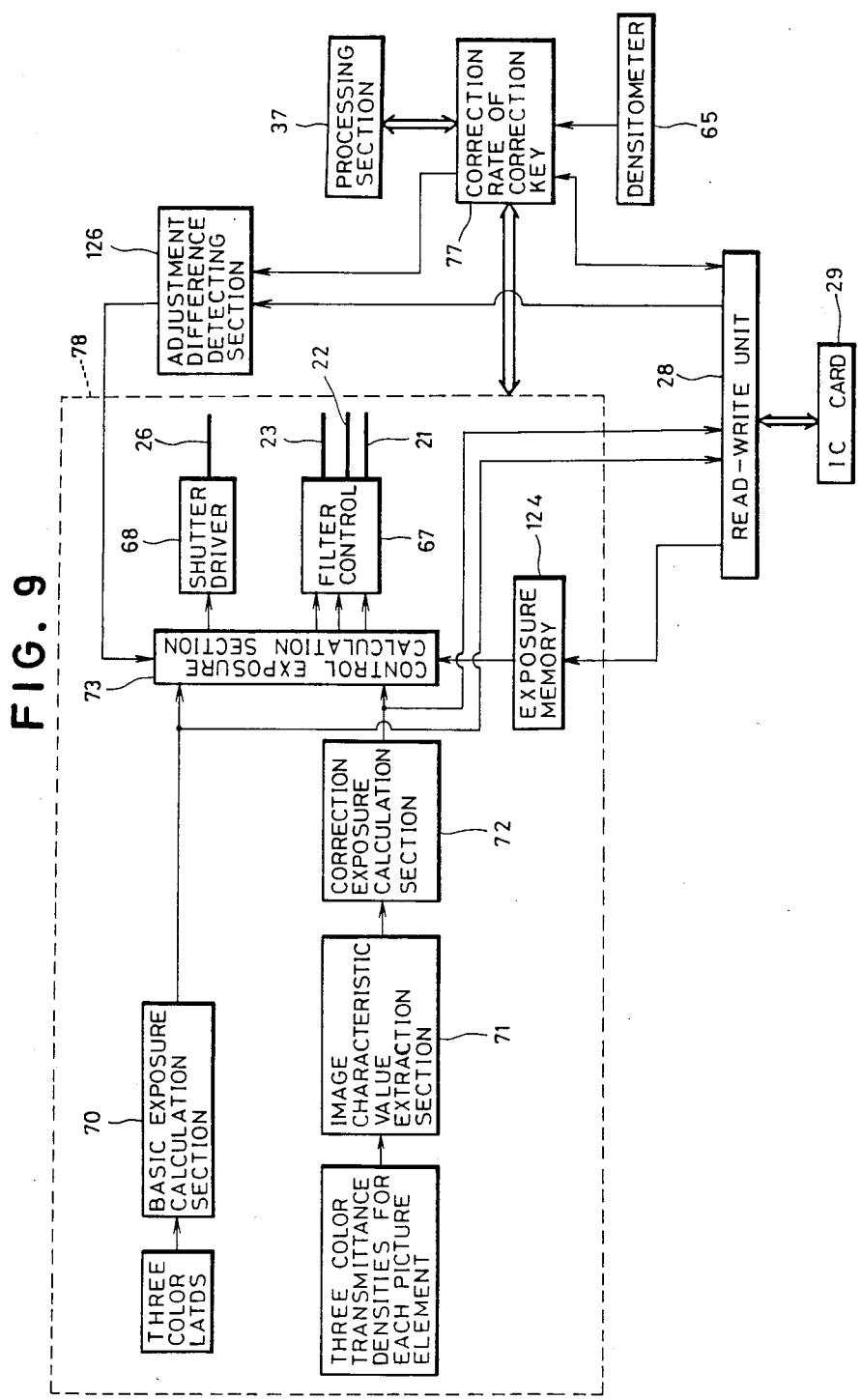
FIG. 9 is a functional block diagram of an essential part of yet another preferred embodiment of the present invention.

FIG. 9 shows another embodiment of the present invention which is suitable for making extra prints. In this embodiment simultaneous printing is effected in the same manner as described for the previous embodiment. When all frames of the color negative 19 are printed correctly and simultaneously, the read-write unit 28 files a color negative code number, data on the intensity or amount of light emitted from the lamp which is detected by the sensor S2, and data on original positions of the color filters 21 to 23, for the negative; and data of the basic and correction exposures for each printed frame, into the non-contact IC card 29, as shown in FIG. 10.

When making extra prints from a color negative which is specified by a color negative ode number, an IC card 29 which includes the exposure data of the specified color negative is taken from a large number of IC cards. The selected IC card 29 is loaded in the read-write unit 28 of the printer-processor 10: the color negative 19 is set so as to place a needed frame thereof in the negative carrier 18. Then, the negative number and the frame number of the frame for which an extra print is needed are entered via the keyboard 30. The control section 77 reads out data on the exposure and control conditions for the frame according to the entered negative code number and frame number. The data on the exposure conditions, in particular the basic and correction exposures, are filed in the exposure memory 124. On the other hand, the data on the control conditions such as the amount or intensity of light and the original positions of the color filters are sent to an adjustment difference detecting section 126.

For reprinting or making an extra print, the scanner 52 and the sensors 43 to 55 do not measure the color negative. The basic and correction exposures are not calculated. The data on the basic and correction exposures for the needed frame, which are filed in the exposure memory 124 upon inserting the IC card 29 into the read-write unit 28, are retrieved and are sent to the control exposure calculation section 123. The adjustment difference detecting section 126 detect differences between the original filter positions retrieved from the IC card 29 and the existing original filter positions retrieved from the control section 77. The detection section 126 detects also a difference between light intensities upon simultaneous printing and reprinting. The data corresponding to these differences are sent to the control exposure calculation section 73 and are referred to in order to correct the total exposures of the basic and correction exposures and to provide proper exposures for three colors. According to the proper exposures, the exposure time of the shutter 26 and the positions of the color filters 21 to 23 are finally determined. After this final determination, reprinting is started in the same manner as for the simultaneous printing.

Figure 11:
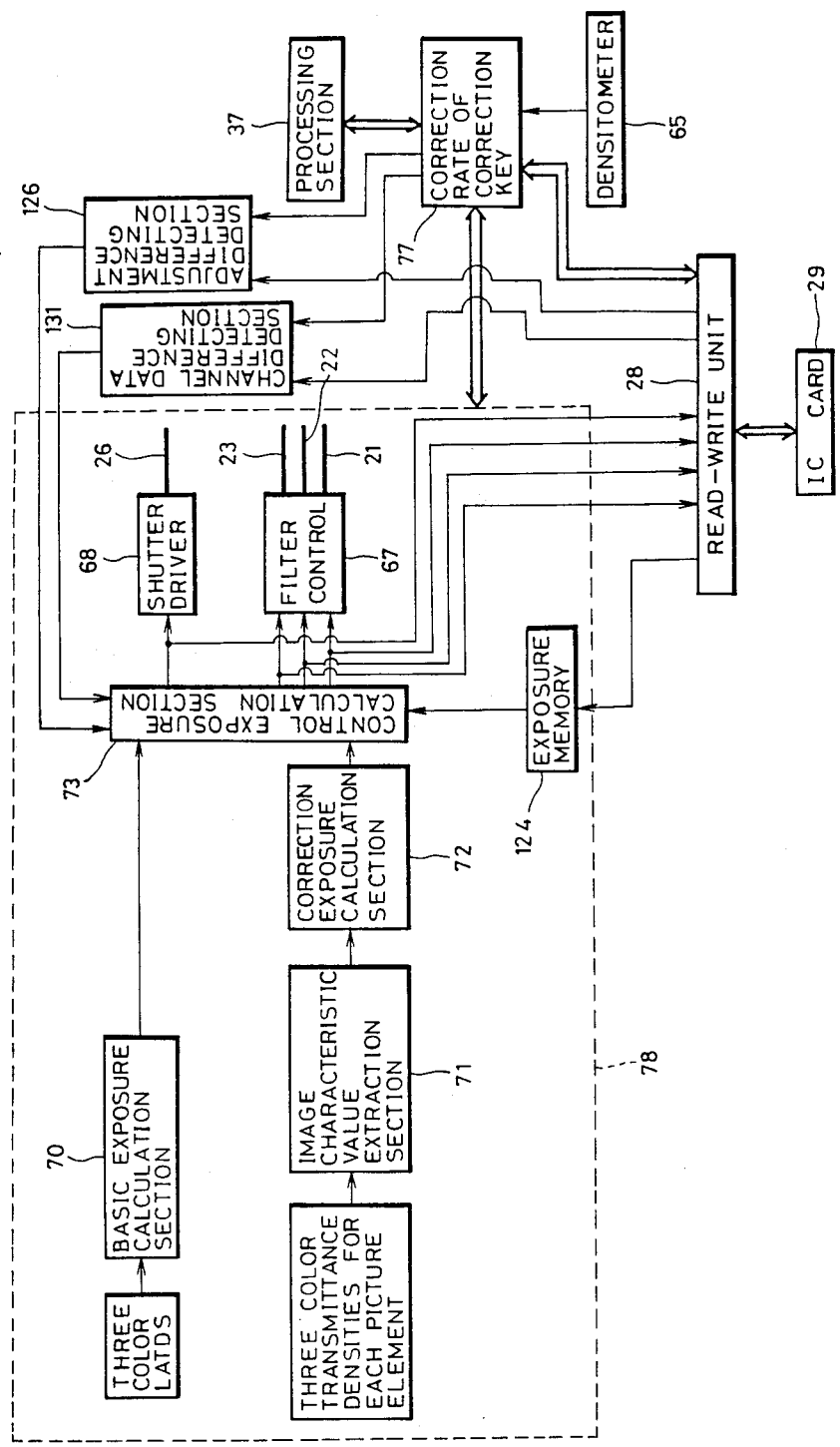
FIG. 11 is a functional block diagram of an essential part of a further preferred embodiment of the present invention.

FIG. 11 shows still another preferred embodiment of the present invention, which is suitable to make extra prints, and in which the position adjustments of the color filters and the exposures are used as exposure control factors. In this embodiment, exposure control data filed in the non-contact IC card 29 upon simultaneous printing include data on the original positions of the color filters 21 to 23, the amount or intensity of light, and a selected channel data for each color negative; and data o actually adjusted positions of the color filters 21 to 23 and the exposure time for each frame, as shown in FIG. 12.

Upon making extra prints, the IC card 29 is inserted into the read-write unit 28, and the keyboard 30 is operated to start operational control sequence for the printer-processor 10. The data on the adjusted position of the color filters 21 to 23 and the exposure time for each frame are read out and filed in the exposure memory 124. On the other hand, data on the original positions of the color filters 21 to 23 and the amount or intensity of light are read out from the IC card 29 and filed in the adjustment difference detecting section 126. The channel data is transmitted to a channel data difference detecting section 131. These detecting sections 126 and 131 compare the adjustments of the color filters 21 to 23 from the IC card 29 with adjustments from the control section 77, and the exposure time from the IC card 29 with that from the control section 77 to detect the difference therebetween. The detected differences of the adjustments of filter and the exposure times for each color then are sent to the control exposure calculation section 73 to correct the control exposures transmitted from the IC card 29. According to the difference of adjustment of the filters, 21. 22, 23 for each color and the exposure time, each color filter 21. 22. 23 and the shutter 26 are controlled to provide proper exposure for extra prints.

FIGS. 13 to 16 show another embodiment of the present invention, in which the printer-processor 10 is controlled by a CPU 151 connected thereto through a bus-line 150. Connected to the bus-line 150 are a card reader 152, a display device 155 such as a CRT or a liquid crystal display panel through a driver 154, and a memory 156 such as a ROM or a RAM. The card reader 152 reads out data filed in a memory card 153 to display the data as a message in a home language on the display device 155. This memory card may take various types of cards such as parallel contact IC cards or serial non-contact IC cards. For example, an IC card, may comprise an IC chip and a sheet coil plate sandwiched between plastic plates. When the IC card is inserted into the card reader 152, the sheet coil plate is magnetically connected to a data read out circuit in the card reader 152. Therefore, the IC card has the advantage of being free from static electricity, electrically improper contact, wearing-out, or the like, and can be used without turning off the reader 152. The cards have various capacities: for example, 64K bit, 256K bit or 1M bit. IC cards are now commercially available.

Figure 15A:
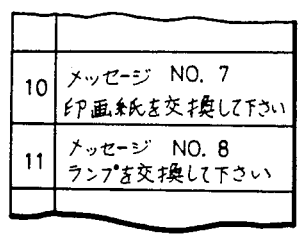
FIGS. 15(A) and (B) are illustrations showing the content of a memory card and the display of message in Japanese.
Figure 15B:
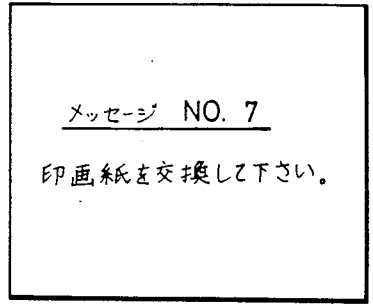

The data on various messages read out from the memory card 153 are displayed as a visual character message in a home language, for example Japanese, on the display device 155 through the driver 154 as is shown in FIG. 15(B).

Figure 14:
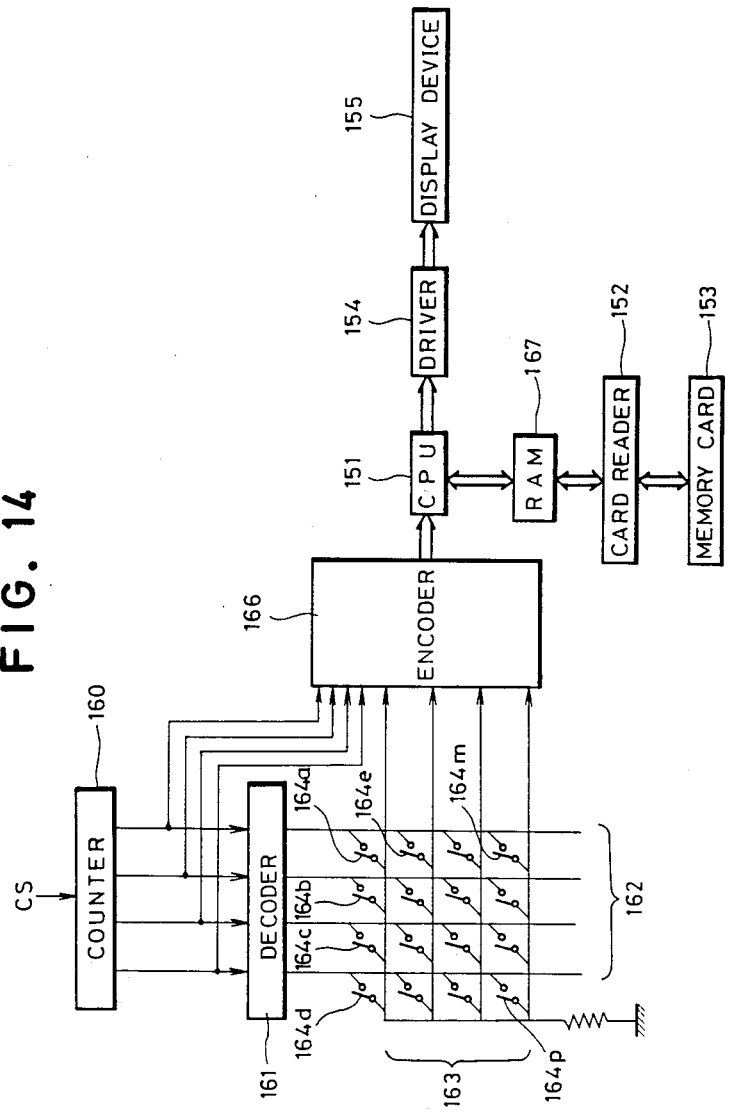
FIG. 14 is a block diagram showing in detail an essential part of the embodiment of FIG. 13.

As is shown in greater detail in FIG. 14, a clock signal CS produced by a timing circuit (not shown) is received and counted by a counter 160. The count of the counter 160 is decoded by a decoder 161 to turn on one of a plurality of Y lines 162. There are a plurality of X lines 163 intersecting the respective Y lines 162. At each X-Y intersection there is a matrix switch. The matrix switches 164a to 164p shown may consist, for example, of transistor switching elements, and are adapted to turn on in response to signals from the sensors S1, S2. . . . S6 or S7.

The X lines 163 ar connected to an encoder 166 to which the clock signal CS is applied from the counter 160. The CPU 151 receives a signal from the encoder 166, indicating an address of a RAM 167, to access that address of the RAM 167 and then to send the accessed data at that address to the display device 155 through the driver 154. The RAM 167 is provided as part of the memory 156 shown in FIG. 12 so as to file data sent from the memory card 153 when setting up the printer-processor 10. The provision of the RAM 167 avoids use of the memory card 153 every time the printer-processor 10 is stopped and restarted. If the RAM 157 is provided, the CPU 151 accesses the data in the memory card 153 directly every time the printer-processor 10 is restarted to operate.

Figure 16A:
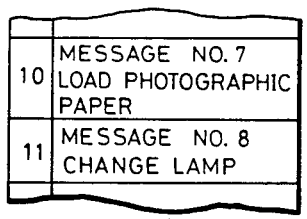
FIGS. 16(A) and (B) are illustrations showing the content of a memory card and the display of message in English.

While the printer-processors 10 are manufactured independently from countries in which they are used, the memory cards 153 are provided for various different languages spoken in these countries. As shown in FIG. 15(A). when the printer-processor 10 is used in Japan, the memory card 153 associated with the printer-processor 10 has data on messages in Japanese. On the other hand, if the printer-processor 10 is used in English-speaking countries, a memory card having data on messages in English, as shown in FIG. 16(A). is provided for the printer-processor 10.

After the installation of the printer-processor 10 in a lab-shop, the memory card 153 is inserted into the card reader 152 to file the data in the memory card 153 into the RAM 167. Thereafter, the memory card 153 is removed and returned to its storage location.

The printing operation of the printer-processor 10 may be carried out either in the same manner as those for the previous embodiments, or may be carried out in any well known manner. During the printing operation, the various sensors S1 to S7 check the associated elements. For example, the sensor S1 detects the color photographic paper and the sensor S6 detects a predetermined proper temperature of color developer. If any one of the sensors Sl to S7 detects any failure, the matrix switch 64 associated with that sensor turns off. For example, when the matrix switch 164a turns off and the deorder 161 changes the output of the first one of the four Y lines 162 (as viewed from the right in FIG. 3) to a high level. "H", the output of the first, or uppermost, one of the four X lines 163 is changed to "H". By combining the signals from the counter 160 and the X lines 163, the one of the sensors S1 to S7 producing a failure signal is determined. This combined output signal is sent to the CPU 151 through the encoder 166. The CPU 151 accesses the RAM 167 with the combined output signal as an address signal to read out the data at the address, which in turn is sent to the driver 154. The driver 154 causes the display device 155 to display the data as a message in Japanese, as shown in FIG. 15(B).

Figure 16B:
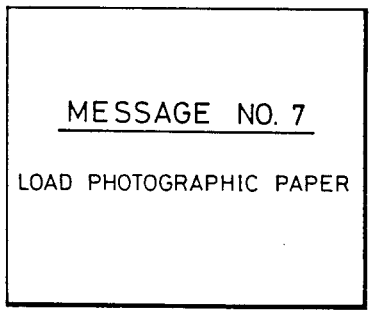

If an English language memory card 153 has been used when the printer-processor 10 is installed in a lab-shop, the display device 155, as shown in FIG. 16(B), displays the data as the same message in English as shown in Japanese in FIG. 15(B).

In place of the messages indicating operating conditions, it is convenient to display various messages, for example, indicating an operation direction or failures occurring in the printer-processor 10.

Figure 17:
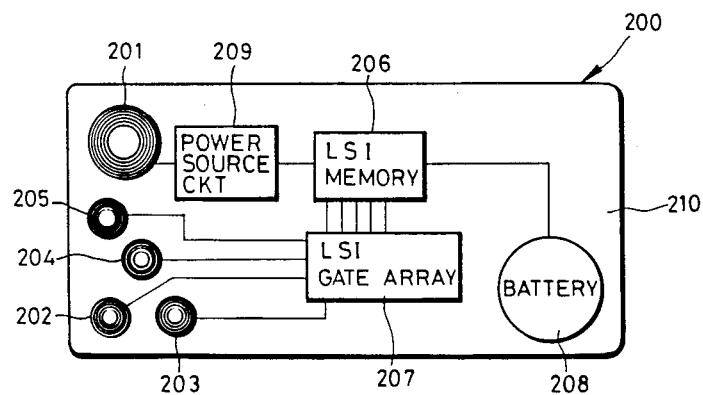
FIG. 17 is a schematic illustration showing an example of the IC card for use with the printer-processor of the preferred embodiments of FIGS. 4. 6, 9 and 11.

For the reliable insertion of the above-described IC card or the memory card, a device preferably is provided for checking the proper insertion of these cards into the read-write unit 28. The IC card 29, as shown in FIG. 17, comprises various sheet coils 201, 202, 203, 204, and 205 serving as a power source and clock generator, a writing means, a reading means, a read-write switching means, and a checking means, respectively: an LSI memory 206; an LSI gate array 207; a battery 208; and a power source circuit 209, all of which are sandwiched between plastic plates 210. The power and clock sheet coil 201 functions as part of a transformer and, by mutual induction, receives a clock pulse from the read-write unit 28 shown in FIG. 18. The clock pulse sent to the power source circuit 209 is converted into a direct current constant voltage output which in turn is supplied to the LSI memory 206 and the LSI gate array 207. The clock pulse is sent also to a timing circuit (now shown) to be changed into driving pulses by which the LSI memory 206 and the LSI gate array 207 are driven.

The sheet coil 202 functioning as a writing means receives serial data from the read-write unit 28 by mutual induction and writes the serial data in the LSI memory 206 through the LSI gate array 207. The sheet coil 203 functioning as a reading means reads out the serial data from the LSI memory 206 through the LSI gate array 207 and converts it into magnetic signals which are sent to the read-write unit 28. The read-write switching sheet coil 204 is provided to receive a read-write signal from the read-write unit 28.

The checking sheet coil 205 is specially provided in the IC card 29 for detecting whether the IC card 29 is properly inserted into the read-write unit 28, and is available to write in and read out data. In place of the special checking sheet coil 205, the reading sheet coil 202 may be used as a checking means to check the proper insertion of the IC card 29.

The LSI memory 206 is provided to store fixed data for setting up the printer-processor 10 or operation data from the printer-processor 10. This LSI memory 206 is backed up by the battery 208 to prevent the data therein from disappearing. The LSI gate array 207 is provided to control data communication direction.

Figure 18:
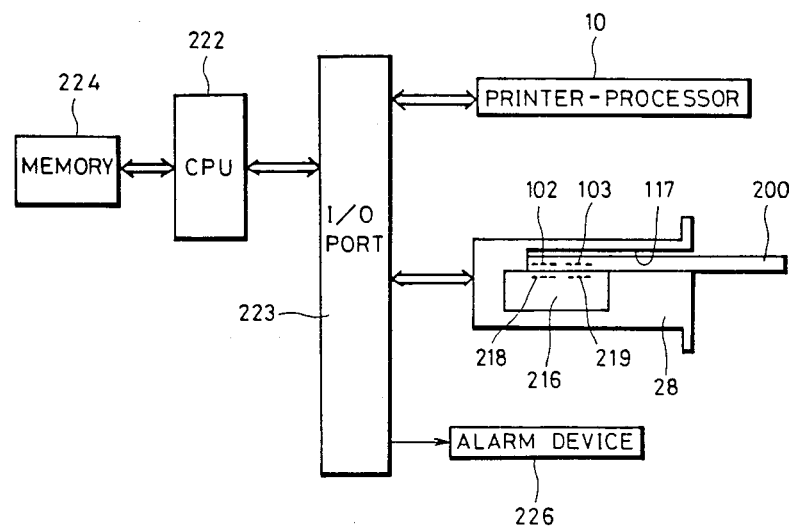
FIG. 18 is a block diagram showing an IC card system.

As shown in FIG. 18, the read-write unit 28 in which a read-write head 216 is incorporated has card slo 217. The rad-write head 216 is provided with Various sheet coils corresponding to the respective sheet coils 201 to 205 of the IC card 29. Only the sheet coils 218 and 219 corresponding to the reading and writing sheet coils 202 and 203 are shown in FIG. 18.

CPU 222 reads out and writes serial data in the IC card 29 through I/0 port 223 and the read-write head 216. The CPU 222 also controls the printer-processor 10 in accordance with the data read out from the IC card 29 and from a memory 224 comprising a RAM or a ROM. The memory 224 is used to store therein an operation program and to write in and read out data. An alarm device 226 connected to the I/0 port 223, sets off an alarm when the IC card 29 is improperly inserted into the read-write unit 28.

Figure 19:
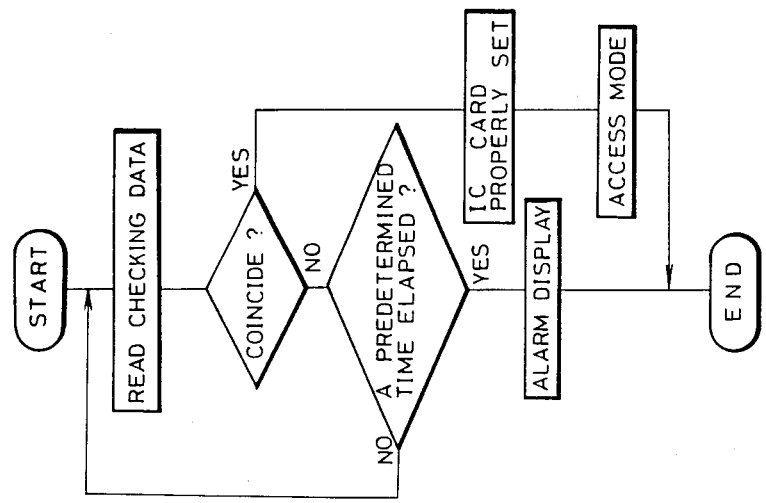
FIG. 19 is a flow chart showing an example of an IC card checking operation in the IC card system of FIG. 18.

Details of the checking of the IC card 29 now will be provided with reference to FIG. 19. Prior to the operation of the printer-processor 10, the IC card 29 is inserted into the read-write unit 28 through the card slot 217. When effecting the communication of data between the IC card 29 and the read-write head 216, the read-write unit 28 is set to a card checking mode and then to an access mode. In the card checking mode, the IC card 29 is supplied with power from the read-write head 216 through the power and clock sheet coil 201. The CPU 222 sends a read signal to the IC card 29 through the I/0 port 223 and the read-write head 216. When the read signal is detected by read-write switching sheet coil 204, the LSI memory 206 and LSI gate array 207 become ready for reading. Consequently, the checking data in the LSI memory 206 is read and transmitted as a magnetic signal through the checking sheet coil 205.

Only when the IC card 29 is properly inserted into the read-write unit 28 can the read-write head 216 read the checking data from the IC card 29. The checking data read by the read-write head 216 is transmitted to the CPU 222 and is compared with a checking data in the memory 224. If in fact these checking data are identical, the IC card 29 is judged to be properly inserted into the read-write unit 28. On the other hand, if the IC card 29 is inserted improperly, for example upside down or backwards, into the read-write unit 28, the read-write head 216 reads nothing, and so improper insertion is identified. Therefore, the proper insertion of the IC card 29 ca be checked by whether the read-writ head receives the checking data from the IC card 29. If the read-write head 216 receives nothing, after a predetermined time has elapsed after the starting of the card checking mode, an alarm is displayed by the alarm device 226 to indicate the improper insertion of the IC card 29.

When the proper insertion of the IC card 29 is detected, the read-write unit 28 is set automatically to the access mode. The CPU 32 reads data from or write data to the IC card 29 through the I/0 port 223 and the read-write head 216. At this time, the read-write switching sheet coil 204 receives a read-write signal so as to enable the LSI memory 206 and the LSI gate array 207 for reading out or writing in data. In the reading mode, data in the LSI memory 206 is sent to the read-write head 216 through the reading sheet coil 203. On the other hand, in the writing mode, data from the read-write head 216 is received by the writing sheet coil 202 and written in the LSI memory 206 through the LSI gate array 207.

Instead of storing the checking data in the IC card 29 it may be permissible to judge the proper insertion of the IC card 29 by writing in and then reading out the checking data from the IC card 29. If the checking data written in the IC card 29 is read out, the IC card 29 is judged to be properly inserted into the read-write unit 28. In this case, as the writing and reading sheet coils 202 and 203 can be used to check, and the checking sheet coil 205 may be omitted.

Figure 20:
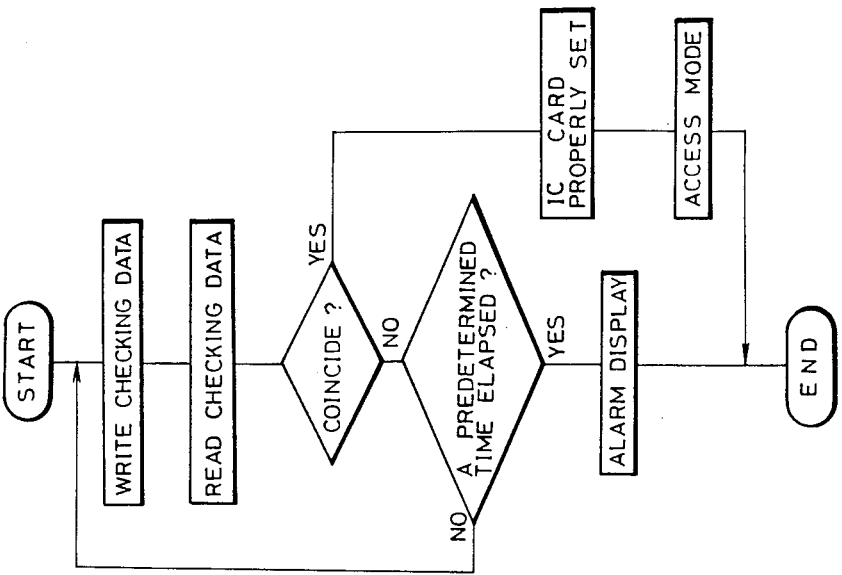
FIG. 20 is another flow chart showing another example of an IC card checking operation in the IC card system of FIG. 18.

As shown in FIG. 20 in greater detail, the CPU 222, in the checking mode, executes alternating writing and reading cycles until the insertion of the IC card 29 is detected. In the writing cycle, the CPU 222 causes the read-write head 216 to provide a read signal and retrieves the checking data from the memory 224. If the IC card 29 is properly inserted in the read-write unit 28, the read-write switching sheet coil 204 receives the read signal; the writing sheet coil 202 receives the checking data and writes it into the LSI memory 206. However, if the IC card 29 is improperly inserted into the read-write unit 28, no checking data is written in the LSI memory 206.

Following the writing cycle, the CPU 222 provides a read signal to read out the checking data written in the IC card 29. If the IC card 29 is inserted properly in the read-write unit 28 the checking data written in the IC card 29 in the writing cycle can be read out through the reading sheet coil 203 and checked whether to be coincident with the checking data in the memory 224.

When the checking data is read out from the IC card 29 the IC card 29 is judged to be properly inserted into the read-write unit 28: the read-write unit 28 then is changed to the access mode to execute reading out and writing in data. On the other hand, if no checking data is read out from the IC card 29, the IC card 29 is judged to be improperly inserted into the read-write unit 28. In this case, the writing and reading cycles are alternated until the checking data is read out from the IC card 29. If a predetermined time is elapsed and a predetermined number of cycles have been carried out, the alarm device 226 puts out an alarm to indicate that the checking data cannot be read out.

Figure 21:
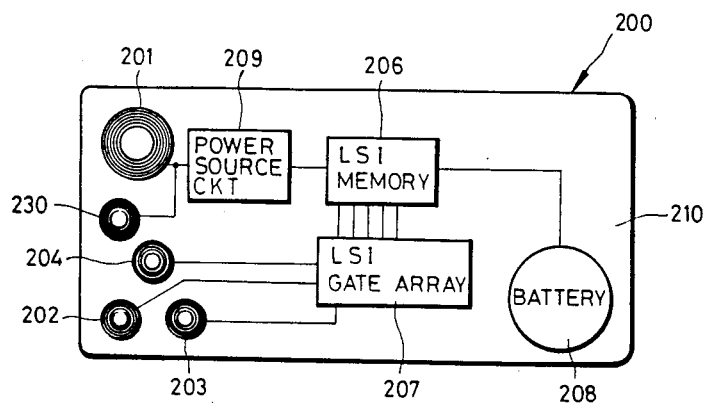
FIG. 21 is a schematic illustration showing another example of the IC card for use with the printer-processor of the preferred embodiments of FIGS. 4, 6, 9 and 11.

For more simple checking of proper insertion of the IC card 29, power supplied to the IC card 29 may be checked. As shown in FIG. 21, the IC card 29 has the same construction as that shown in FIG. 17, except for the provision of a detecting sheet coil 230 in place of the checking sheet coil 205. The detecting sheet coil 230, which is connected to the power source circuit 209, receives part of a high frequency electric power applied to the IC card 29 to provide a magnetic signal. The detecting sheet coil 230 may be connected to a pulse generating section provided in the IC card 29 for generating a pulse when the IC card 29 is supplied with electric power.

Figure 22:
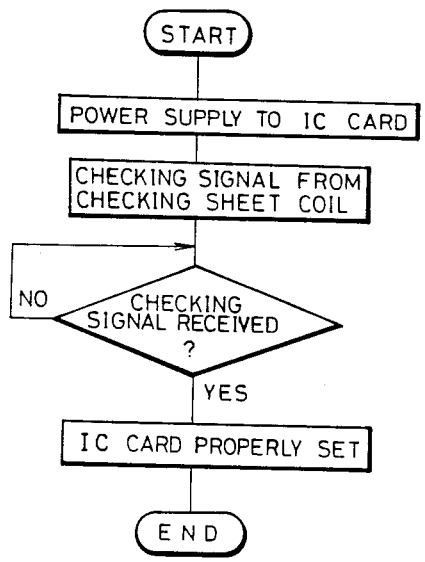
FIG. 22 is a flow chart showing an example of an IC card checking operation for checking the IC card of FIG. 21.

As shown in FIG. 22, when the IC card 29 is properly inserted into the read-write unit 28 the IC card 29 can receive electric power, causing the detecting sheet coil 230 to provide a magnetic signal. If the read-write head 216 receives this magnetic signal, the IC card 29 is judged to be inserted properly into the read-write unit 28. Otherwise, the IC card 29 is judged as to be inserted improperly into the read-write unit 28. Because there is a magnetic connection between the IC card 29 and the read-write head 216, a magnetic signal can be detected by the read-write head 216 even though the IC card 29 gets slightly out of position in the read-write unit 28. However, if in fact the IC card 29 gets out of position, the level of magnetic signal which is received by the detecting sheet coil 230 becomes lower. To avoid reading or writing errors, it is preferred to check a predetermined level of magnetic signal, to judge whether the IC card 29 is placed in position in the read-write unit 28.

Although the present invention has been fully described in detail above with reference to preferred embodiments thereof, modifications within the scope of the present invention will be apparent to those skilled in the art. Thus, the invention should be considered to be limited only by the appended claims which follow immediately.

What is claimed is:

1. A photographic printing system for making prints from a negative, said system comprising:
   a program-controlled printer-processor for making prints from a negative;
   a non-contact integrated circuit (IC) card having at least one data storage area for storing operation data of said printer-processor: and
   a non-contact type read-write means incorporated in said printer-processor through which said data is transferred between said IC card and said printer-processor.

2. A system as defined in claim 1, wherein said operation data includes data on red, green, and blue exposure control conditions.

3. A system as defined in claim 2, wherein said exposure control conditions include a basic exposure obtained based on a large area transmittance density of said negative from which a print is made, a correction exposure, an exposure time, and an adjusted position of a color filter.

4. A system as defined in claim 1, wherein said operation data includes data on a time of operation of said printer-processor, an identification number of said negative, a type of photographic paper used, and the number of prints made in every operation of said printer-processor.

5. A photographic printing system for making prints, said system comprising:
   a program-controlled printer-processor with a color detecting scanner incorporated therein and having correction keys associated therewith for correcting printing conditions;
   a plurality of integrated circuit (IC) cards each having different printing control conditions data; and
   read-write means, incorporated in said printer-processor, for reading said data of one of said plurality of said IC cards selectively inserted therein and setting said printer-processor to a printing control conditions in accordance with said read out data.

6. A system as defined in claim 5, wherein said printing control conditions include a scanner operating mode and a correction rate of one step of operation of said each correction key.

7. A system as defined in claim 5, wherein said printing conditions include channel data.

8. A system as defined in claim 5, wherein said read out data includes data for sequential control of operation of said printer-processor.

9. A photographic printing system for making prints from a plurality of negatives under desirably individually controlled printing conditions, said system comprising:
   a program-controlled printer-processor for printing each frame of each of said negatives under printing conditions which are controlled for said each frame:
   a data recording card for automatically recording data on said individually controlled printing conditions for said each frame of said negative during printing; and
   means for reading out said data from said data recording card and setting said printer-processor to said individually controlled printing conditions when an extra print is made from said frame of said negative.

10. A system as defined in claim 9, wherein said data recording card is an integrated circuit (IC) card from which said data can be read in and out in a non-contact manner.

11. A photographic printing system including a program-controlled printer-processor and a data recording card for making prints, said system comprising:
    means for recording, on said data recording card, exposure control conditions and printer-processor controlling conditions under which a print of an individual frame of a negative is made for the first time; and
    means for making an extra print of said individual frame of said negative by using said exposure control conditions read out from said data recording card and a difference between said printer-processor controlling conditions read out from said data recording card and printer-processor controlling conditions to which said printer-processor is presently set.

12. A system as defined in claim 11, wherein said printer-processor controlling conditions include original positions of color filters which are used to control a printing light, a light intensity of a lamp which exposes said negative to a photographic paper, and channel data.

13. A system as defined in claim 11, wherein said data recording card is a serial non-contact type IC card.

14. A photographic printer-processor having a character display unit, said printer-processor comprising:
    a plurality of memory cards in which data of different statements in different languages are stored, each of said plurality of memory cards storing therein data of said different statements in one of said different languages; and
    read-out means for reading out data of at least one of said plurality of statements of one of said plurality of memory cards so as to display said read out data as a visual statement on said character display unit.

15. A printer-processor having a character display unit, said printer-processor comprising:
    a plurality of memory cards in which data of various statements in different languages are stored, each of said plurality of memory cards storing therein data of a plurality of statements in the same language;

a memory for filing said data stored in one of said plurality of memory cards; and means for providing an access signal in accordance with which said memory means is accessed to display said data of at least one of said plurality of statements as a visual character statement on said character display unit.

16. A non-contact integrated circuit (IC) card reading system comprising:

an IC card having a sheet coil for storing data; and read-write means having a read-write coil for reading and writing said data in said IC card placed therein through a magnetic connection between said read-write coil and said sheet coil, said IC card being judged to be properly placed in position with respect to said read-write means only when checking data is read out from said IC card.

17. An IC card reading system as defined in claim 16, wherein said checking data is previously written in said IC card.

18. An IC card reading system as defined in claim 16, wherein said checking data is written in said IC card through said read-write means immediately before reading out said stored data in said IC card.

19. An IC card reading system as defined in claim 17, wherein said sheet coil is provided only for said checking data reading.

20. An IC card reading system as defined in claim 18, wherein said sheet coil is provided only for said checking data reading.

21. An IC card reading system as defined in claim 17, wherein said sheet coil is common to said checking data reading and said stored data reading and writing.

22. An IC card reading system as defined in claim 18, wherein said sheet coil is common to said checking data reading and said stored data reading and writing.

23. A non-contact integrated circuit (IC) card reading system comprising:

an IC card having a checking sheet coil for storing data; and read-write means for reading and writing said data in said IC card placed therein;

said checking sheet coil providing a signal when receiving power from said read-write means, said IC card being judged to be placed in position with respect to said read-write means only when said read-write means receives said signal from said checking sheet coil.

* * * * *